(12) United States Patent
Hiramatsu

(10) Patent No.: US 7,583,312 B2
(45) Date of Patent: Sep. 1, 2009

(54) EXPOSURE CONTROL OF IMAGE INPUT APPARATUS

(75) Inventor: Makoto Hiramatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 10/989,714

(22) Filed: Nov. 16, 2004

(65) Prior Publication Data

US 2005/0110894 A1    May 26, 2005

(30) Foreign Application Priority Data

Nov. 20, 2003  (JP)  ............................. 2003-390751

(51) Int. Cl.
*H04N 5/238* (2006.01)
*G03B 7/00* (2006.01)
*H04N 5/235* (2006.01)
*G02F 1/00* (2006.01)
*G03B 9/08* (2006.01)
*G03B 9/28* (2006.01)

(52) U.S. Cl. .................... 348/367; 348/362; 396/457; 396/469; 396/479

(58) Field of Classification Search ......... 348/326–369; 396/452–504; 720/738–744, 643, 663; 352/204–220
See application file for complete search history.

(56) References Cited

U.S. PATENT DOCUMENTS

| 5,457,514 A | 10/1995 | Hasuda et al. | |
| 5,758,213 A * | 5/1998 | Goto et al. | 396/235 |
| 6,542,194 B1 * | 4/2003 | Juen | 348/367 |
| 6,936,984 B2 * | 8/2005 | Wilson | 318/280 |
| 2004/0081446 A1 * | 4/2004 | Compton | 396/362 |
| 2005/0063698 A1 * | 3/2005 | Usuda et al. | 396/489 |
| 2006/0087573 A1 * | 4/2006 | Harada | 348/294 |

FOREIGN PATENT DOCUMENTS

| JP | 01-117577 | 5/1989 |
| JP | 04-070283 | 3/1992 |
| JP | 06-208157 | 7/1994 |
| JP | 06-265965 | 9/1994 |
| JP | 09-005830 | 1/1997 |
| JP | 10-020363 | 1/1998 |

(Continued)

OTHER PUBLICATIONS

Japanese Official Action dated Jun. 19, 2007 regarding Application 2003-390751.

(Continued)

*Primary Examiner*—Sinh Tran
*Assistant Examiner*—Christopher K Peterson
(74) *Attorney, Agent, or Firm*—Cowan, Liebowitz & Latman, P.C.

(57) ABSTRACT

An image input apparatus that includes a solid-state image sensing device having a plurality of pixels; a shutter having a front curtain and a rear curtain for opening and blocking an optical path to the solid-state image sensing device; a shutter-curtain sensor that senses passage of the front and rear curtains at a plurality of positions; and a reset unit that resets pixels of the solid-state image sensing device successively before the sensor senses passage of the rear curtain upon elapse of a prescribed period of time after the sensor senses passage of said front curtain.

6 Claims, 14 Drawing Sheets

FOREIGN PATENT DOCUMENTS

| | | |
|---|---|---|
| JP | 11-041523 | 2/1999 |
| JP | 2001-272718 | 10/2001 |
| JP | 2002-290804 | 4/2002 |
| JP | 2002-277204 * | 9/2002 |
| JP | 2003-078815 | 3/2003 |
| JP | 2003-101873 A | 4/2003 |
| JP | 2003-131114 | 5/2003 |

OTHER PUBLICATIONS

English Language Abstract for JP 2002-290804.
Chinese Office Action dated Oct. 13, 2006 for corresponding Chinese Patent Application 20041009459501.

* cited by examiner

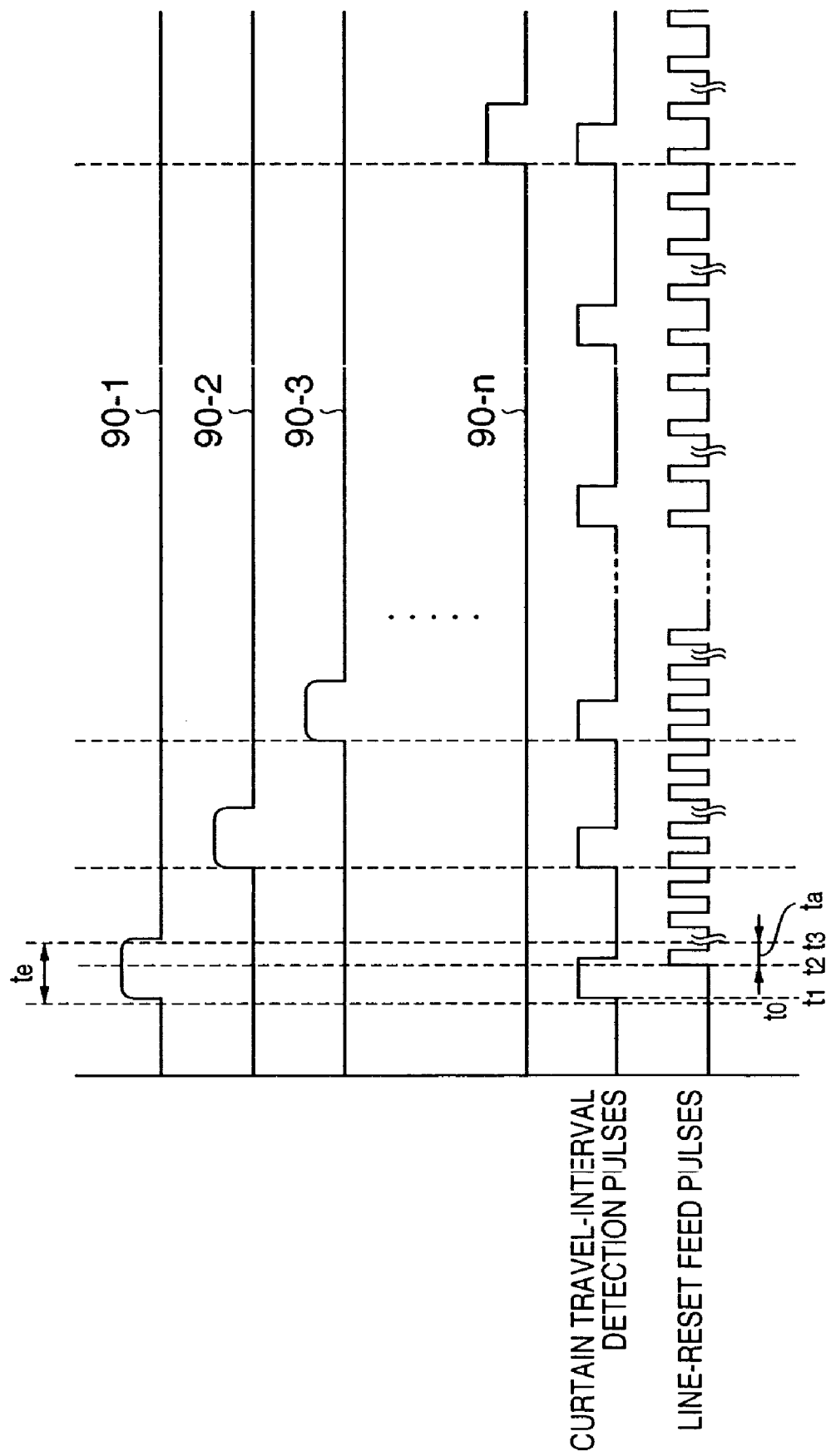

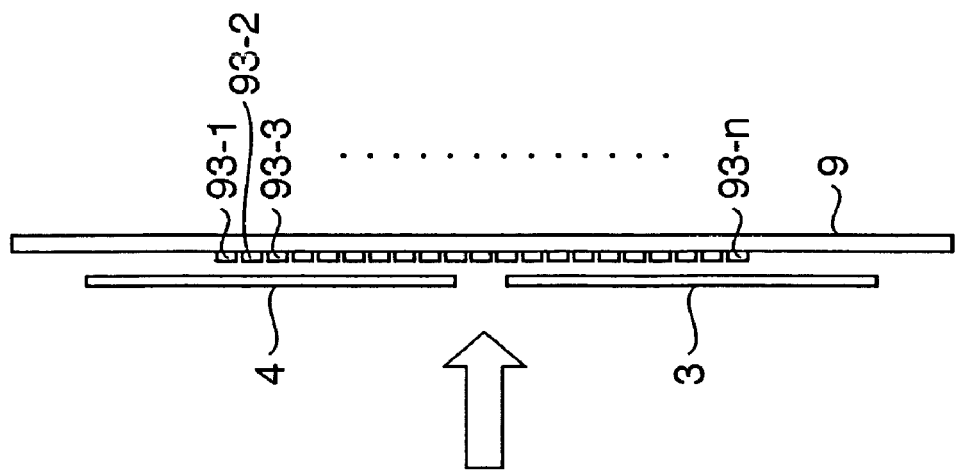
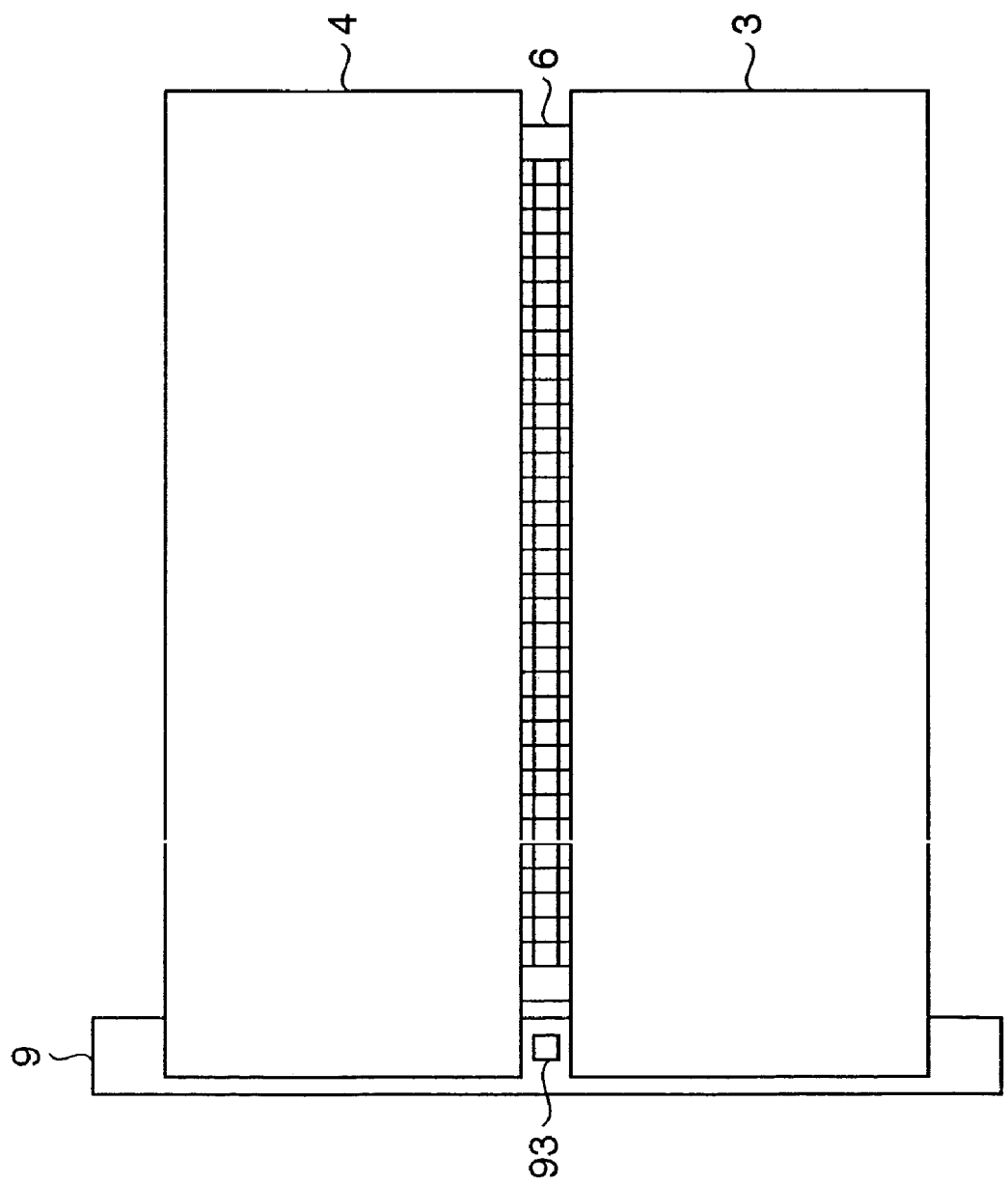

EXPOSURE CONTROL OF IMAGE INPUT APPARATUS

FIELD OF THE INVENTION

This invention relates to an image input apparatus and to a method of controlling the same. More particularly, the invention relates to control of high-speed exposure in an image input apparatus.

BACKGROUND OF THE INVENTION

In an image input apparatus, such as a digital camera, for capturing an image using a solid-state image sensing device, exposure is performed by opening and closing a mechanical shutter.

In a case where use is made of an image sensor such as an interlaced-readout interline (IT) CCD, frame-readout (FT) CCD or CMOS sensor, the general practice is to set the sensor to a charge accumulation state and open and close the mechanical shutter in this state, whereby exposure is performed.

The structure of a prior-art image input apparatus is illustrated in FIG. 12 (for example, see the specification of Japanese Patent Application Laid-Open No. 2003-101873). FIG. 12 illustrates the structure of a so-called focal-plane shutter-type arrangement in which the shutter is disposed in the vicinity of the focal plane of the lens.

Although light from a subject forms an image on a solid-state image sensing device 6 via a lens 1, it is possible to shield the solid-state image sensing device 6 from the light from the subject by the shutter 2. The shutter 2 is controlled by a shutter drive unit 5. The shutter 2 comprises front and rear curtains 3 and 4, respectively. The solid-state image sensing device 6 is driven by a sensor driving circuit 7 and is controlled in a charge accumulation mode for accumulating electric charge generated in accordance with the amount of light that is incident on the photoreceptor surface of the solid-state image sensing device 6, and in a readout mode for reading out the electric charge accumulated. Control for driving the solid-state image sensing device 6 in these modes is exercised by a CPU 8.

FIG. 13 is a diagram illustrating the structure of the solid-state image sensing device 6.

The solid-state image sensing device 6 includes a plurality of pixels 14. A line is formed by disposing a prescribed number of the pixels 14 horizontally, and a prescribed number of those lines are disposed vertically on different lines, thereby a two-dimensional sensor is constructed. Peripheral circuitry (not shown) is disposed at the periphery of the sensor, thereby constructing the solid-state image sensing device 6.

FIG. 14 illustrates the timing for driving the shutter 2 and solid-state image sensing device 6.

The solid-state image sensing device 6 is set to the charge accumulation mode by a sensor driving circuit 7 and travel of the front curtain 3 is started by the shutter drive unit 5. Travel of the rear curtain 4 is started by the shutter drive unit 5 upon elapse of S seconds. At completion of travel of the rear curtain 4, the solid-state image sensing device 6 is placed in the readout mode by the sensor driving circuit 7 and the accumulated electric charge (image data) is read out. At this time, each pixel of the solid-state image sensing device 6 is irradiated with light for a period of time (S seconds) equivalent to the difference between the travel times of the front and rear curtains.

With the prior art described above, however, short exposure time for high-speed exposure is decided by mechanical limitations. In general, if use is made of a focal-plane shutter that transports a slit, the precision achieved on the high-speed exposure side owing to mechanical limitations is 1/4000 to 1/8000 sec.

On the other hand, in a case where use is made of a progressive-scan (total-pixel readout) ITCCD, the mechanical shutter can be opened in advance and control of exposure time by an electronic shutter can be performed. In the case of this arrangement, there are no mechanical restraints on the side of high-speed exposure. With use of an electronic shutter, it is possible to achieve a high-speed exposure of 1/16000 sec., etc., which is at least twice as fast as that when there is a mechanical limitation.

However, with an interlaced-readout ITCCD, FTCCD or CMOS sensor, it is impossible because of sensor structure to control exposure time at the above-described level on the side of high-speed exposure by an electronic shutter.

SUMMARY OF THE INVENTION

The present invention has been made in view of the foregoing circumstances and its object is to realize control of exposure time for high-speed exposure without mechanical limitations in an image input apparatus.

According to the present invention, the foregoing object is attained by providing an image input apparatus comprising: a solid-state image sensing device having a plurality of pixels; a shutter having a front curtain and a rear curtain for opening and blocking an optical path to the solid-state image sensing device; a sensor that senses passage of the front and rear curtains at a plurality of positions; and a reset unit that resets pixels of the solid-state image sensing device successively before the sensor senses passage of the rear curtain upon elapse of a prescribed period of time after the sensor senses passage of the front curtain.

According to the present invention, the foregoing object is attained by providing an image input apparatus comprising: a solid-state image sensing device having a plurality of pixels; a shutter having a front curtain and a rear curtain for opening and blocking an optical path to the solid-state image sensing device; a sensor that senses passage of the front curtain at a plurality of positions; and a reset unit which, in an area wherein the rear curtain has not passed following passage of the front curtain, resets pixels of the solid-state image sensing device successively upon elapse of a prescribed period of time after the sensor senses passage of the front curtain.

According to the present invention, the foregoing object is attained by providing an image input apparatus comprising: a solid-state image sensing device having a plurality of pixels; a shutter having a front curtain and a rear curtain for opening and blocking an optical path to the solid-state image sensing device; a sensor that senses speed at which the front curtain is driven; a reset unit which, in an area wherein the rear curtain has not passed following passage of the front curtain, resets pixels of the solid-state image sensing device successively in accordance with an output from the sensor.

According to the present invention, the foregoing object is attained by providing a method of controlling an image input apparatus that includes a solid-state image sensing device having a plurality of pixels, a shutter having a front curtain and a rear curtain for opening and blocking an optical path to the solid-state image sensing device, and a sensor that senses passage of the-front and rear curtains, the method comprising: sensing passage of the front curtain by the sensor at a plurality of positions; and resetting pixels of the solid-state image sensing device successively before the sensor senses passage of the rear curtain upon elapse of a prescribed period of time after passage of the front curtain is sensed.

According to the present invention, the foregoing object is attained by providing a method of controlling an image input apparatus that includes a solid-state image sensing device having a plurality of pixels, and a shutter having a front curtain and a rear curtain for opening and blocking an optical path to the solid-state image sensing device, the method comprising: sensing passage of the front curtain at a plurality of positions; and in an area in which the rear curtain has not passed following passage of the front curtain, resetting pixels of the solid-state image sensing device successively upon elapse of a prescribed period of time after passage of the front curtain is sensed.

According to the present invention, the foregoing object is attained by providing a method of controlling an image input apparatus that includes a solid-state image sensing device having a plurality of pixels, and a shutter having a front curtain and rear curtain for opening and blocking an optical path to the solid-state image sensing device, the method comprising: sensing speed at which the front curtain is driven; and in an area in which the rear curtain has not passed following passage of the front curtain, resets pixels of the solid-state image sensing device successively in accordance with result of sensing the speed at which the rear curtain is driven.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a timing chart for describing control of exposure time according to the first embodiment;

FIGS. 4A and 4B are diagrams useful in describing placement of a solid-state image sensing device, front and rear curtains and a shutter-curtain detector according to a second embodiment of the present invention;

DETAILED DESCRIPTION OF THE PREFERRED EMBODIMENTS

Preferred embodiments of the present invention will be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
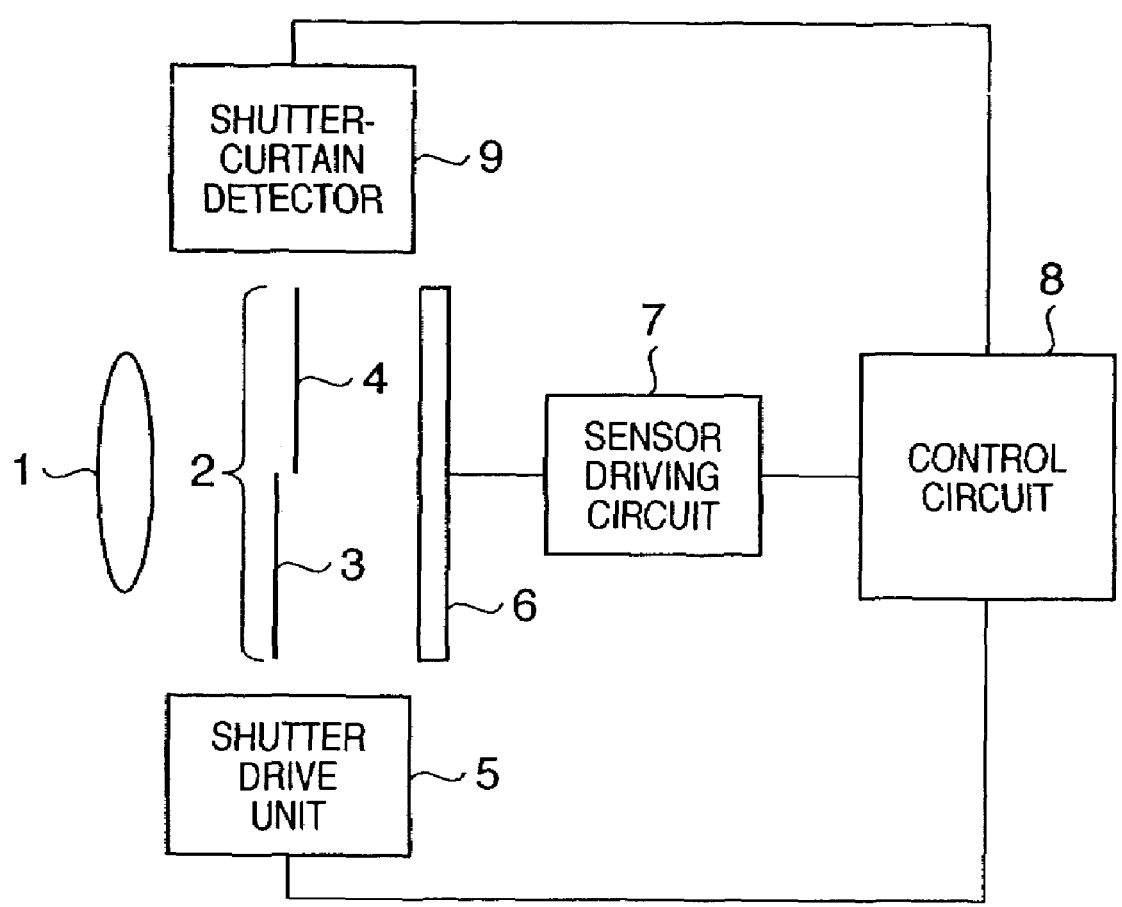
FIG. 1 is a block diagram illustrating the structure of an image input apparatus according to a first embodiment of the present invention.
Figure 12:
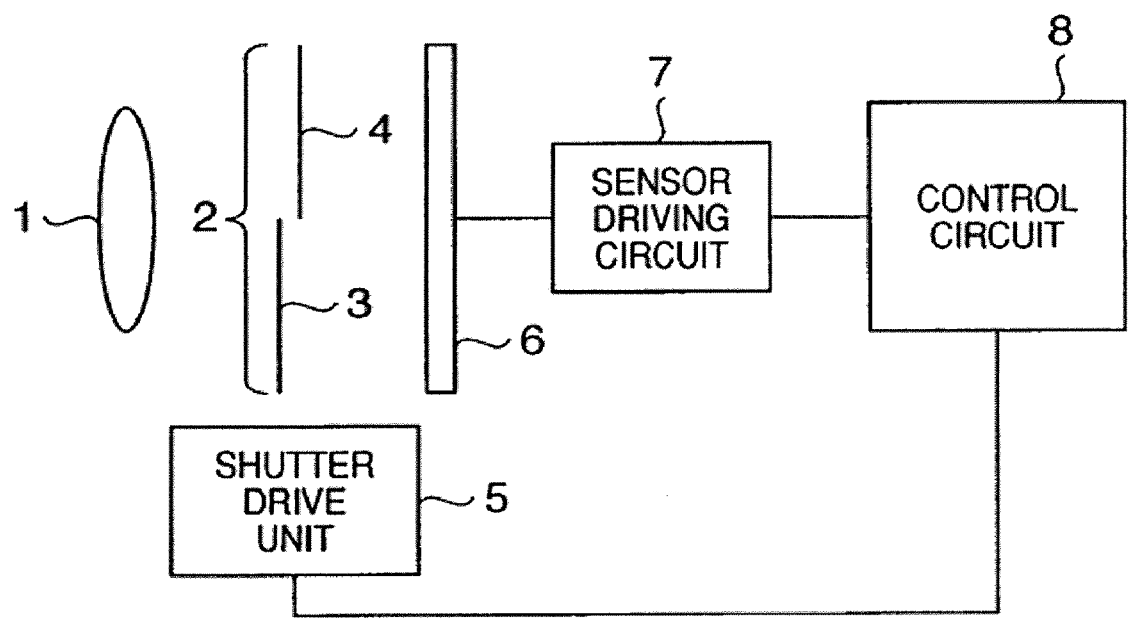
FIG. 12 is a block diagram illustrating the structure of an image input apparatus according to the prior art.

FIG. 1 is a block diagram illustrating the structure of an image input apparatus for capturing an image using a solid-state image sensing device in a first embodiment of the present invention. Components identical with those of the arrangement shown in FIG. 12 are designated by like reference characters.

Figure 13:
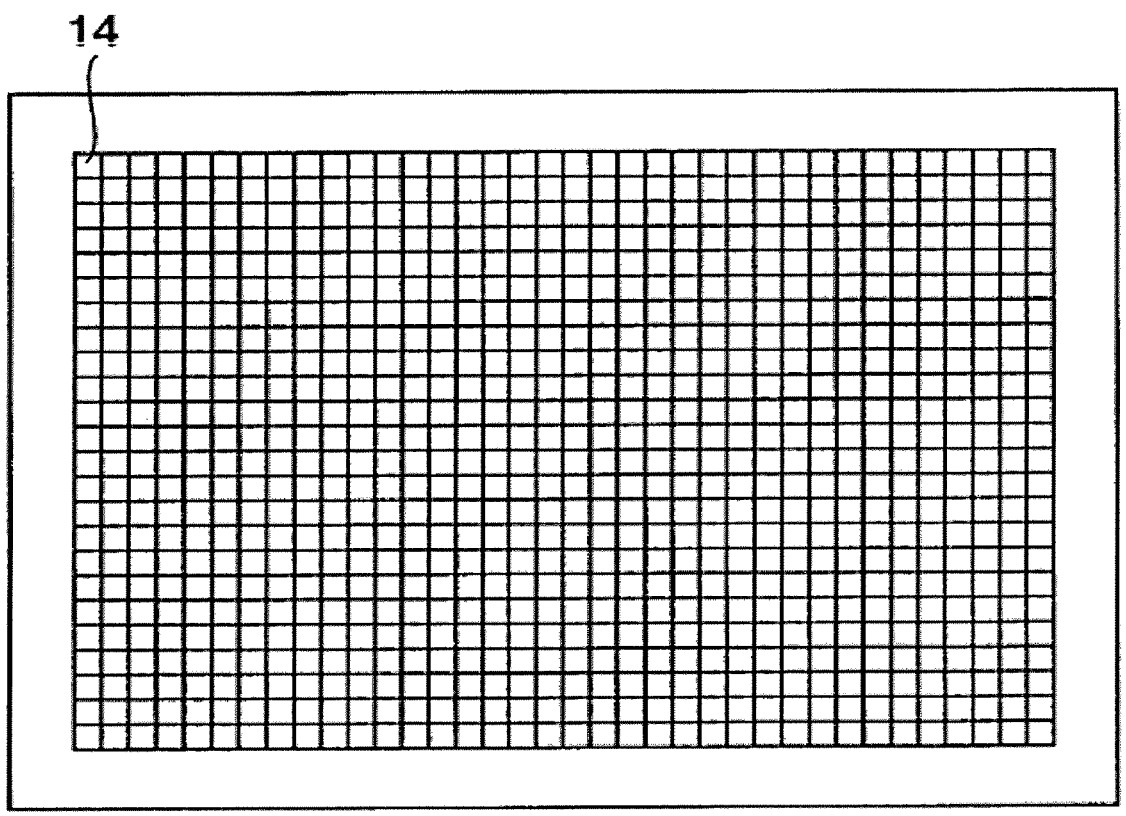
FIG. 13 is a diagram illustrating the structure of a solid-state image sensing device according to the prior art.
Figure 14:
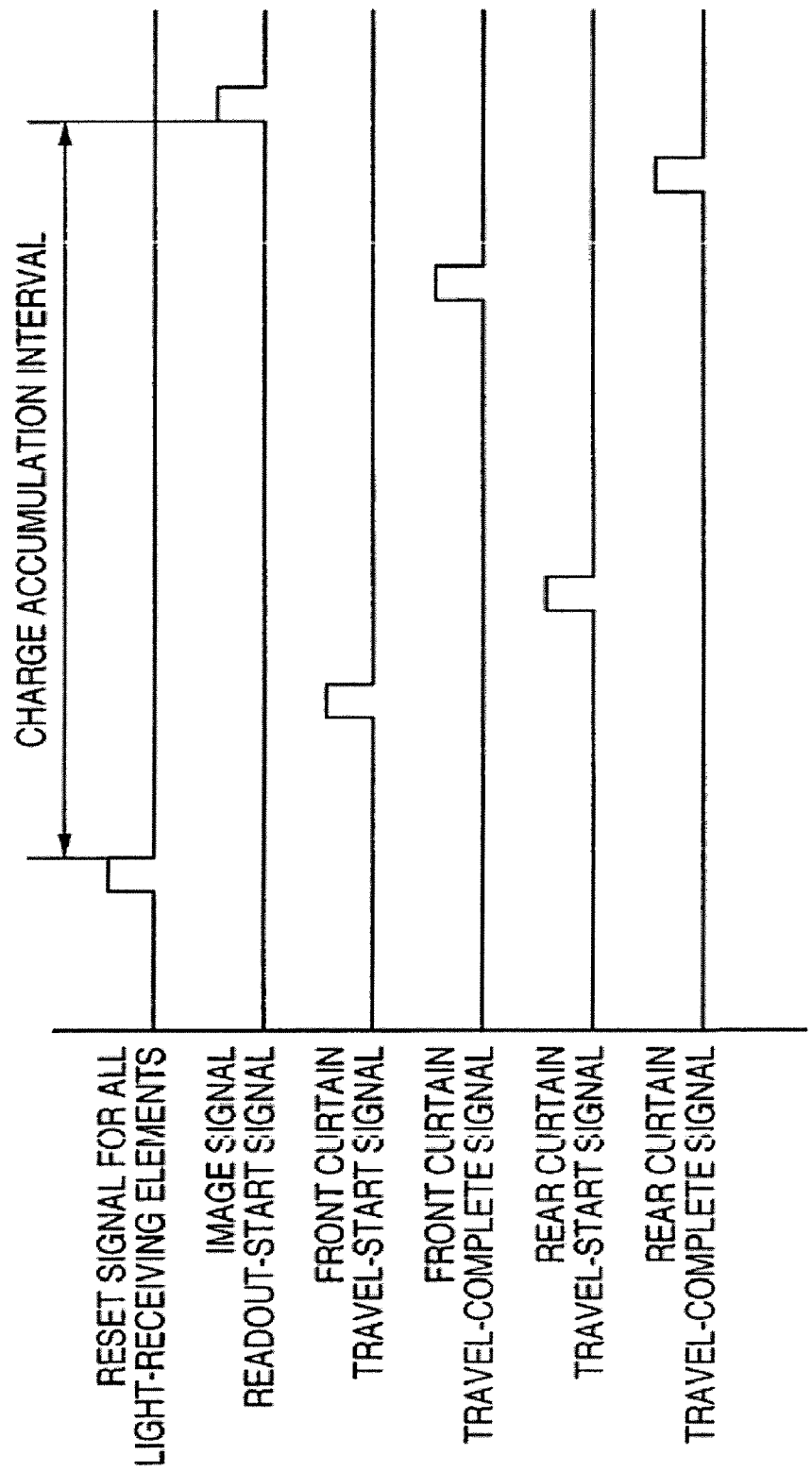
FIG. 14 is a timing chart illustrating the driving of a shutter and the driving of a solid-state image sensing device according to the prior art.

Although light from a subject forms an image on the solid-state image sensing device 6 via the lens 1, it is possible to shield the solid-state image sensing device 6 from the light from the subject by the shutter 2. The shutter 2, which is a focal-plane shutter comprising the front and rear curtains 3 and 4, respectively, is controlled by the shutter drive unit 5. Further, the solid-state image sensing device 6 has the arrangement illustrated in FIG. 13 described above. The solid-state image sensing device 6 is driven by the sensor driving circuit 7 and is controlled in the charge accumulation mode for accumulating electric charge, for every pixel 14, generated in accordance with the amount of light that is incident on the photoreceptor surface of the solid-state image sensing device 6, and in the readout mode for reading out the electric charge accumulated. Control for driving the solid-state image sensing device 6 in these modes is exercised by the CPU 8. The positions of the front curtain 3 and rear curtain 4 are detected by a shutter-curtain detector 9.

Figure 2B:
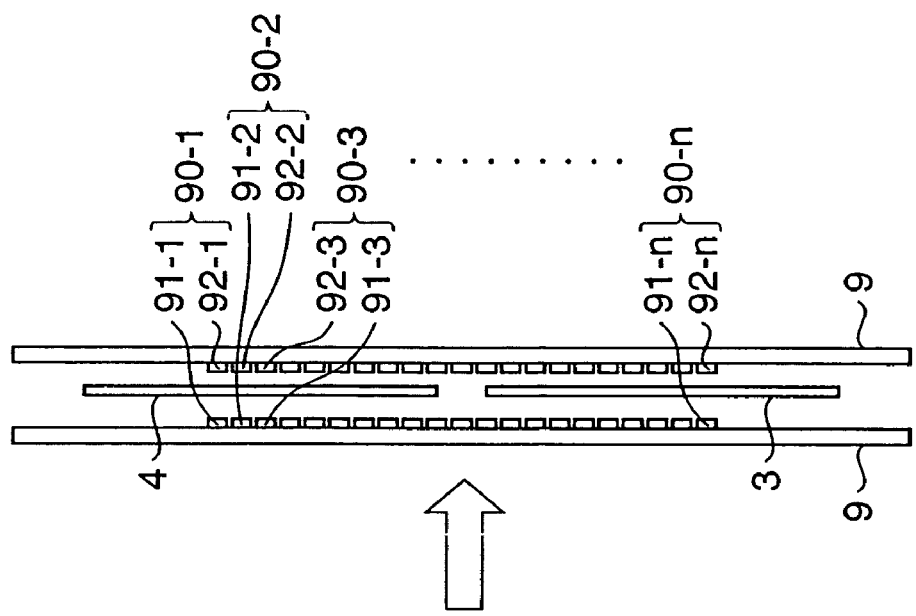
FIGS. 2A and 2B are diagrams useful in describing placement of a solid-state image sensing device, front and rear curtains and shutter-curtain detector according to the first embodiment.
Figure 2A:
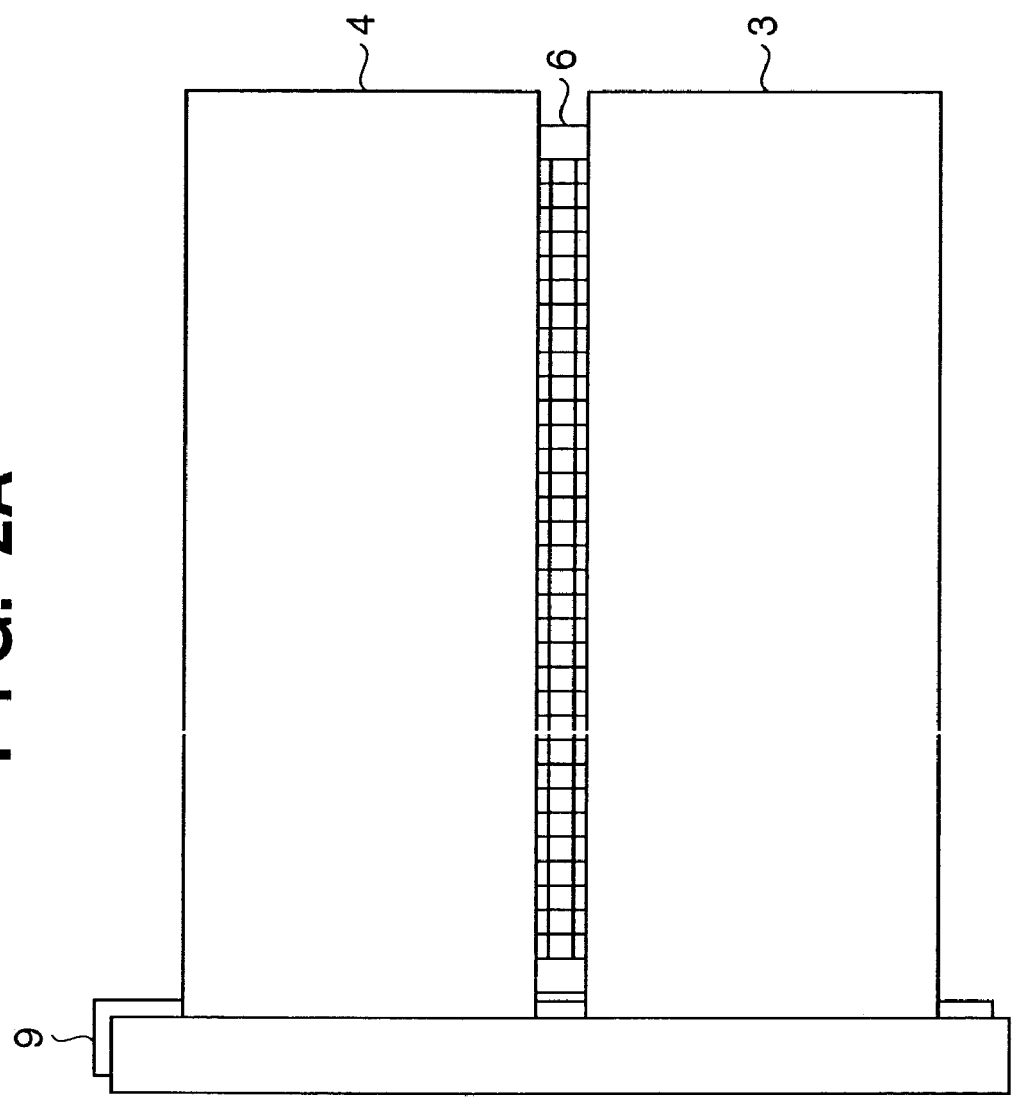

FIGS. 2A and 2B are diagrams useful in describing placement of the solid-state image sensing device 6, front and rear curtains 3, 4 and shutter-curtain detector 9 according to the first embodiment. FIG. 2A is a front view as seen from the side of lens 1, and FIG. 2B is a sectional view of the shutter-curtain detector 9. Here light impinges from the direction of the arrow.

The shutter-curtain detector 9 has a structure in which a plurality of photo-interpreters 90 (90-1 to 90-n in FIG. 2B) are arrayed in the traveling direction of the shutter curtains. Each photo-interpreter 90 comprises a light-emitting unit 91 (91-1 to 91-n in FIG. 2B) and a light-receiving unit 92 (92-1 to 92-n in FIG. 2B). The photo-interpreters 90 are provided at a ratio of one per N lines of the solid-state image sensing device 6 and are so arranged that the front curtain 3 and rear curtain 4 will pass between the light-emitting unit 91 and the light-receiving unit 92. As will be understood from FIGS. 2A and 2B, the light-receiving unit 92 of the photo-interpreter 90 in the slit portion of the front curtain 3 and rear curtain 4 is capable of receiving light from the light-emitting unit 91. When light from the light-emitting unit 91 is being blocked by the front curtain 3 or rear curtain 4, therefore, the output of the light-receiving unit 92 declines, and when the front curtain 3 and rear curtain 4 are not present between the light-emitting unit 91 and light-receiving unit 92, the output of the light-receiving unit 92 rises.

FIG. 3 is a timing chart illustrating an example of outputs from the photo-interpreters 90-1 to 90-n of the shutter-curtain detector 9 and line-reset feed pulses of the solid-state image sensing device 6.

As shown in FIG. 3, the outputs of the shutter-curtain detector 9 rise in order starting from the uppermost photo-interpreter 90-1 as the front curtain 3 and rear curtain 4 move and neither block the photo-interpreters 90 from light. The output values (pulses) from the photo-interpreters 90-1 to 90-n are input to the control circuit 8, which proceeds to generate curtain travel-interval detection pulses in accordance with the input pulses. Furthermore, the control circuit 8 generates line-reset feed pulses for which N-number of pulses are generated between curtain travel-interval detection pulses so as to correspond to the placement interval (N lines) of the photo-interpreters 90. These pulses are input to the sensor driving circuit 7. The sensor driving circuit 7 resets the pixels 14 every line of the solid-state image sensing device 6 in order from the first line, namely in the order of the $2^{nd}$, $3^{rd}$, $4^{th}$, ..., mth, (m+1)th lines, whenever the pulses are input to the sensor driving circuit 7.

Since the front curtain 3 and rear curtain 4 travel using the restoration force of springs, the traveling speed immediately after travel starts differs from the traveling speed immediately before travel ends. Whenever a curtain travel-interval detection pulse is generated, therefore, the period of the line-reset feed pulses is set to T/N (where T represents the immediately preceding curtain travel-interval detection pulse interval), whereby N-number of pulses can be inserted between signals from the photo-interpreters.

More specifically, when light from the light-emitting unit 91-1 of the photo-interpreter 90-1 starts being incident on the light-receiving unit 92-1 owing to movement of the front curtain 3 at time $t_0$ (i.e., when exposure starts), the output of the light-receiving unit 92-1 starts rising. When the output of the light-receiving unit 92-1 exceeds a prescribed level, the control circuit 8 generates a curtain travel-interval detection pulse at time $t_1$. The control circuit 8 starts generating line-reset feed pulses at $t_2$, which is a prescribed length of time after the output at $t_1$. Since the pixels 14 of the corresponding line are reset by these pulses, the time from the end of reset to the end of exposure of the line at time $t_3$ owing to the rear curtain 4 (a time obtained by subtracting the time needed for reset from a time $t_a$) becomes the charge storage time.

Thus, exposure at an exposure speed greater than that the exposure speed of exposure time $t_e$ based upon shutter 2 becomes possible. It should be noted that the time between $t_1$ and $t_2$ can be found by subtracting the desired charge storage time $t_a$ and reset time from $t_e$.

In accordance with the first embodiment, as described above, by resetting the pixels a prescribed period of time earlier than travel of the rear curtain 4 following travel of the front curtain over each of the pixels of the solid-state image sensing device (i.e., by resetting the pixels upon elapse of a prescribed period of time following travel of the front curtain 3), it is possible to achieve control of exposure time for high-speed exposure without mechanical limitations.

Although the solid-state image sensing device may be of any type, control of exposure time for high-speed exposure without mechanical limitations, which was not feasible in the prior art, can be achieved by applying the invention to a solid-state image sensing device such as an interlaced-readout ITCCD, FTCCD or CMOS sensor in which, because of the structure of the sensor, a limitation is imposed upon control of exposure time on the side of high-speed exposure using an electronic shutter.

Second Embodiment

A second embodiment of the present invention will now be described in detail.

The basic structure of the image input apparatus used in the second embodiment is similar to that of the first embodiment described above with reference to FIG. 1 and the description of the structure is omitted. However, the shutter-curtain detector 9 in the second embodiment has a structure that differs from that shown in FIGS. 2A and 2B.

FIGS. 4A and 4B are diagrams useful in describing placement of the solid-state image sensing device 6, front and rear curtains 3, 4 and shutter-curtain detector 9 according to the second embodiment. FIG. 4A is a front view as seen from the side of lens 1, and FIG. 4B is a sectional view of the shutter-curtain detector 9. Here light impinges from the direction of the arrow. As will be understood from FIGS. 4A and 4B, lines of pixels corresponding to the slit portion of front curtain 3 and rear curtain 4 is exposed.

The shutter-curtain detector 9 according to the second embodiment has a structure in which a plurality of photodiodes 93 (93-1 to 93-n in FIG. 4B) are arrayed in the traveling direction of the shutter curtains. The photodiodes 93 are disposed at a ratio of one per N lines of the solid-state image sensing device 6.

Part of the light from the subject incident via the lens 1 impinges upon the photodiodes 93. By using this light to perform an operation similar to that shown in FIG. 3 of the first embodiment, effects similar to those of the first embodiment can be obtained.

The arrangement of the second embodiment can be realized in a form in which the light-emitting units are omitted from the arrangement of the first embodiment.

Third Embodiment

A third embodiment of the present invention will now be described in detail.

Figure 5:
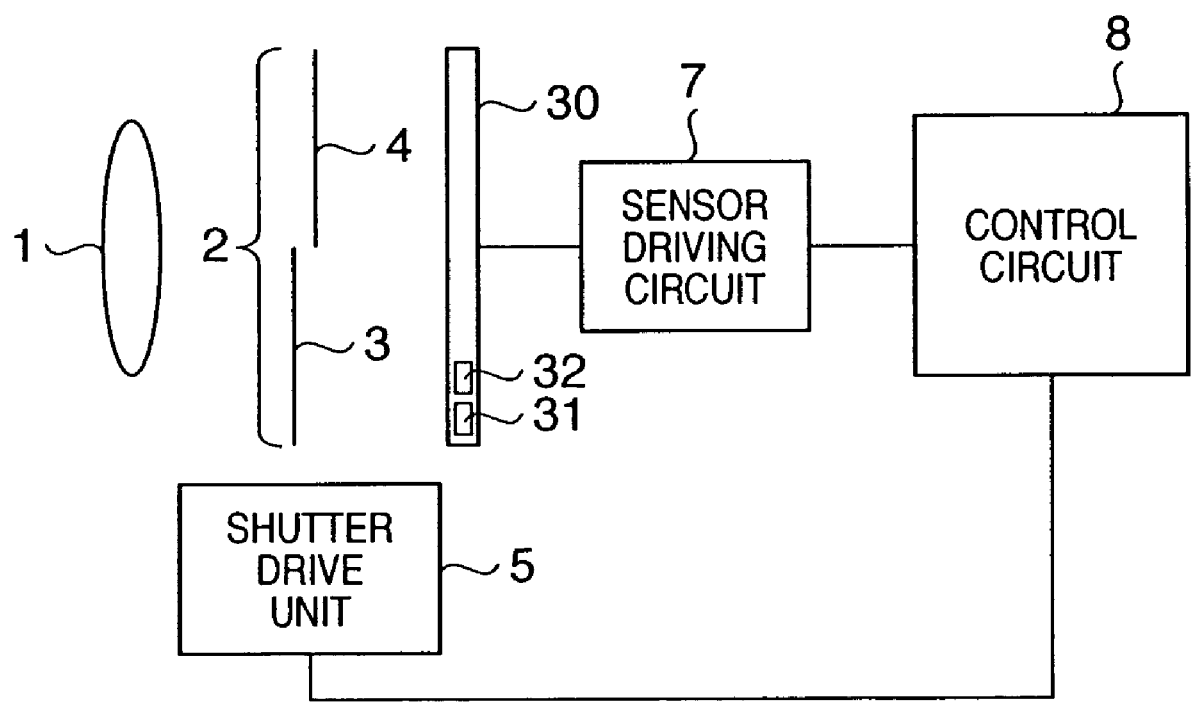
FIG. 5 is a block diagram illustrating the structure of an image input apparatus according to a third embodiment of the present invention.

FIG. 5 is a block diagram illustrating the structure of an image input apparatus for capturing an image using a solid-state image sensing device in a third embodiment of the present invention. The arrangement shown in FIG. 5 differs from that of the solid-state image sensing device 6 of FIG. 12 in that a solid-state image sensing device 30 has a shutter-curtain detector 31 and a line-reset controller 32 for resetting an applicable line upon receiving an output from the shutter-curtain detector 31. Since other structural aspects are similar to those of FIG. 12, these components are designated by like reference characters and description thereof is omitted.

Figure 6:
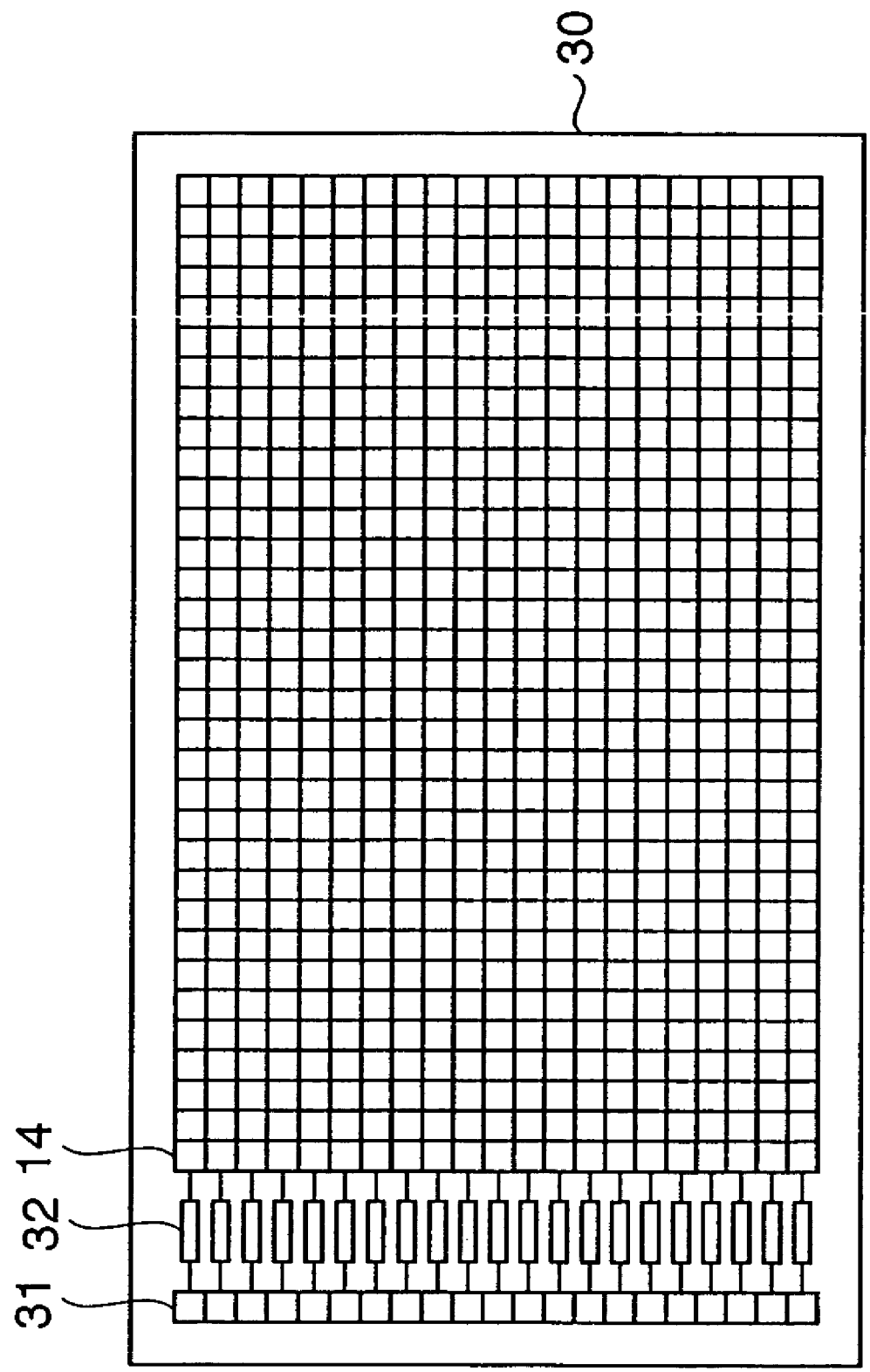
FIG. 6 is a diagram illustrating the structure of a solid-state image sensing device according to the third embodiment.
Figure 7:
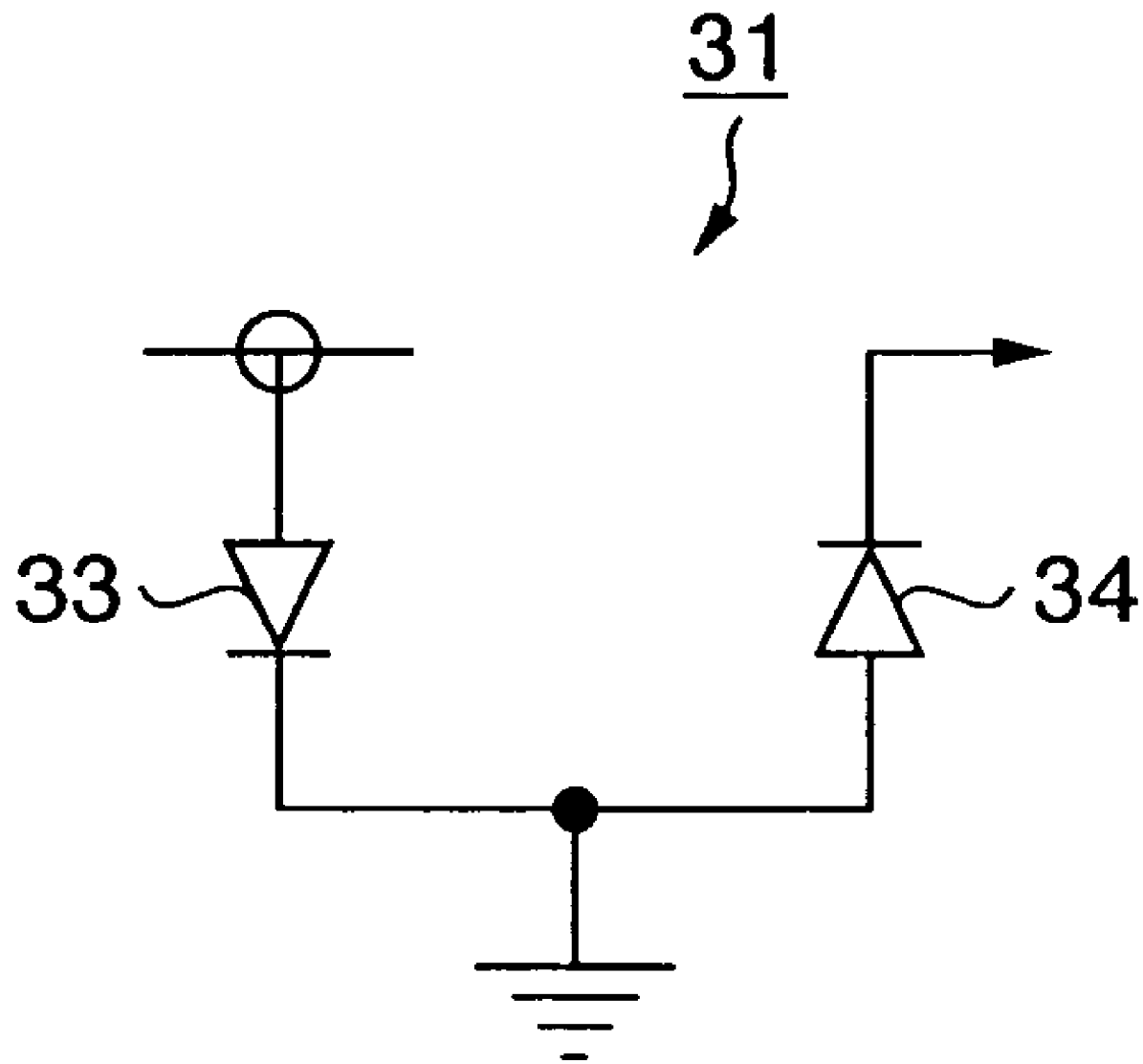
FIG. 7 is a diagram illustrating the circuit arrangement of a shutter-curtain detector according to the third embodiment.

FIG. 6 is a diagram illustrating the structure of the solid-state image sensing device 30 according to the third embodiment of the present invention. The solid-state image sensing device 30 includes the plurality of pixels 14, shutter-curtain detector 31 and line-reset controller 32. Further, FIG. 7 is a diagram illustrating the circuit arrangement of each of detectors configuring the shutter-curtain detector 31, which comprises a light-emitting diode 33 and a photodiode 34.

Figure 8:
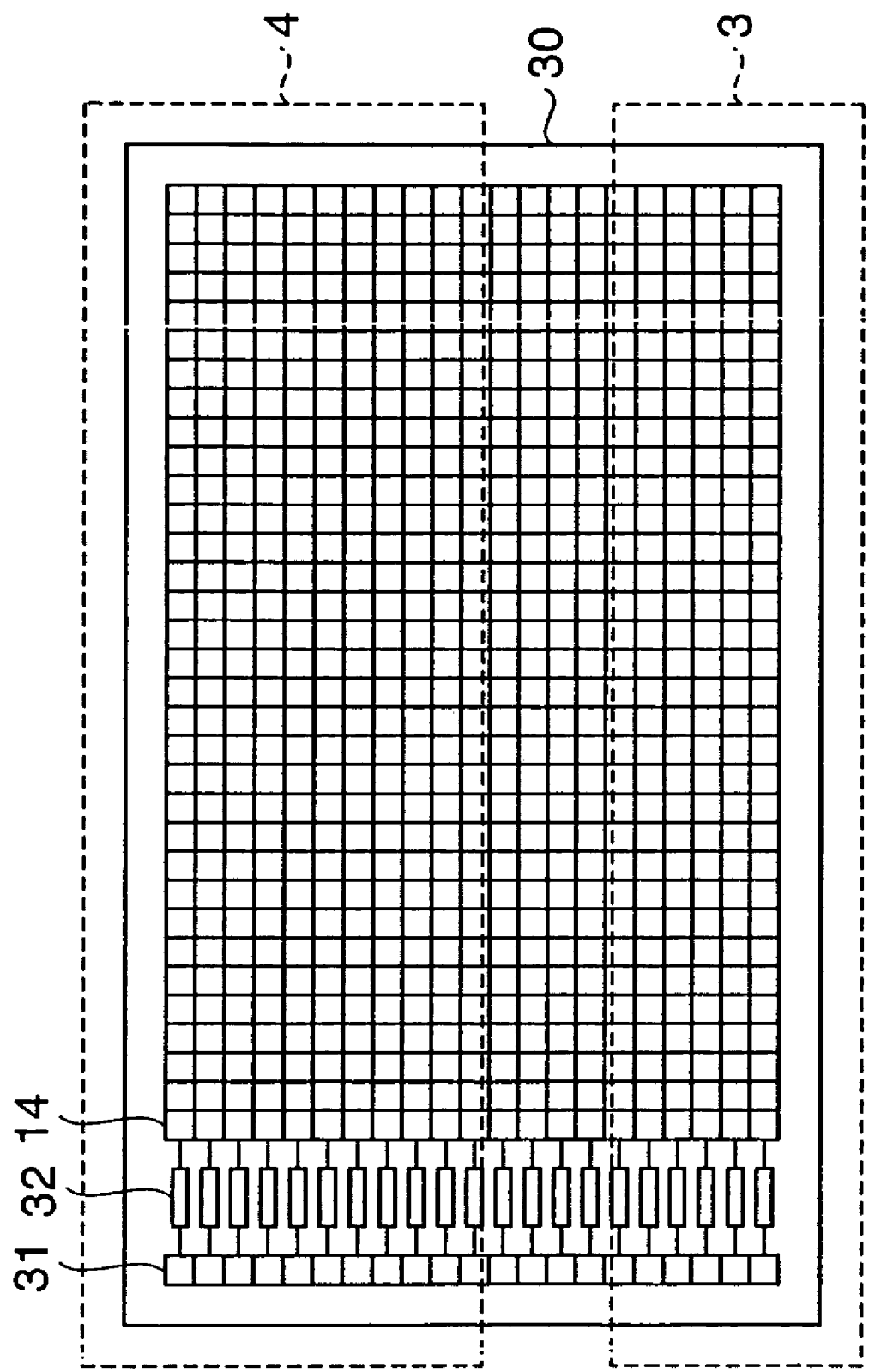
FIG. 8 is a diagram for describing placement of a solid-state image sensing device and front and rear curtains according to the third embodiment.

FIG. 8 is a diagram illustrating the placement of the solid-state image sensing device 30, front curtain 3 and rear curtain 4 when the present invention is implemented.

During the period of time that the front curtain 3 or rear curtain 4 is in front of the solid-state image sensing device 30, light emitted from the light-emitting diode 33 is reflected at the back side of the front curtain 3 or rear curtain 4 and therefore is received by the photodiode 34. When neither the front curtain 3 nor the rear curtain 4 are present in front of the solid-state image sensing device 30, the light emitted from the light-emitting diode 33 emerges by passing between the front curtain 3 and 4 and therefore does not return to the photodiode 34. Accordingly, the signal that is output from the photodiode 34 is the inverse of the signals indicated at 90-1 to 90-n in FIG. 3.

The output from the photodiode 34 of the shutter-curtain detector 31 enters the line-reset controller 32, and a prescribed period of time (which corresponds to $t_2$ in FIG. 3)

after the output of the photodiode 34 vanishes (this corresponds to $t_0$ in FIG. 3), the line-reset controller 32 resets the applicable line.

In accordance with the third embodiment of the present invention as described above, effects similar to those of the first embodiment can be obtained.

Fourth Embodiment

A fourth embodiment of the present invention will now be described in detail.

The basic structure of the image input apparatus used in the fourth embodiment is similar to the structure described above with reference to FIG. 5. However, the structure of the shutter-curtain detector 31 in the fourth embodiment differs from the structure shown in FIG. 7.

Figure 9:
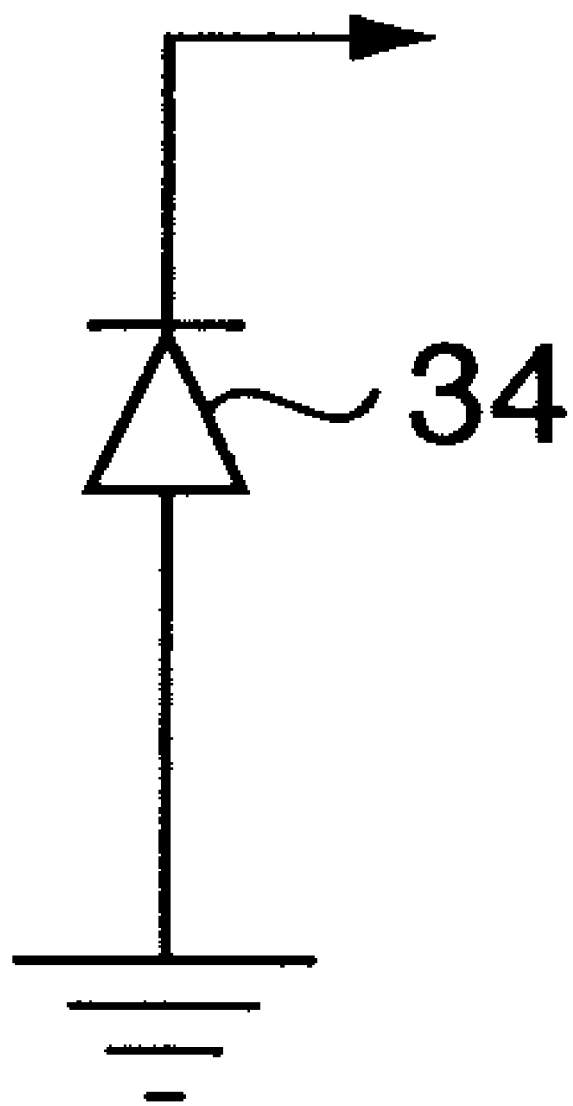
FIG. 9 is a diagram illustrating the circuit arrangement of a shutter-curtain detector according to a fourth embodiment of the present invention.

FIG. 9 is a diagram illustrating the circuit of each of detectors configuring the shutter-curtain detector 31 of the solid-state image sensing device 30 in the fourth embodiment of the present invention. As shown in FIG. 9, each detector of the shutter-curtain detector 31 has a photodiode 34. This is an arrangement in which a light-emitting diode is omitted. Part of the light from the subject incident via the lens 1 impinges upon the photodiode 34. By using this light to perform an operation similar to that described in the third embodiment, exposure control at high-speed exposure can be implemented without mechanical limitations.

The arrangement of the fourth embodiment can be realized in a form in which light-emitting diodes are omitted from the arrangement of the third embodiment.

Fifth Embodiment

A fifth embodiment of the present invention will now be described in detail.

Figure 10:
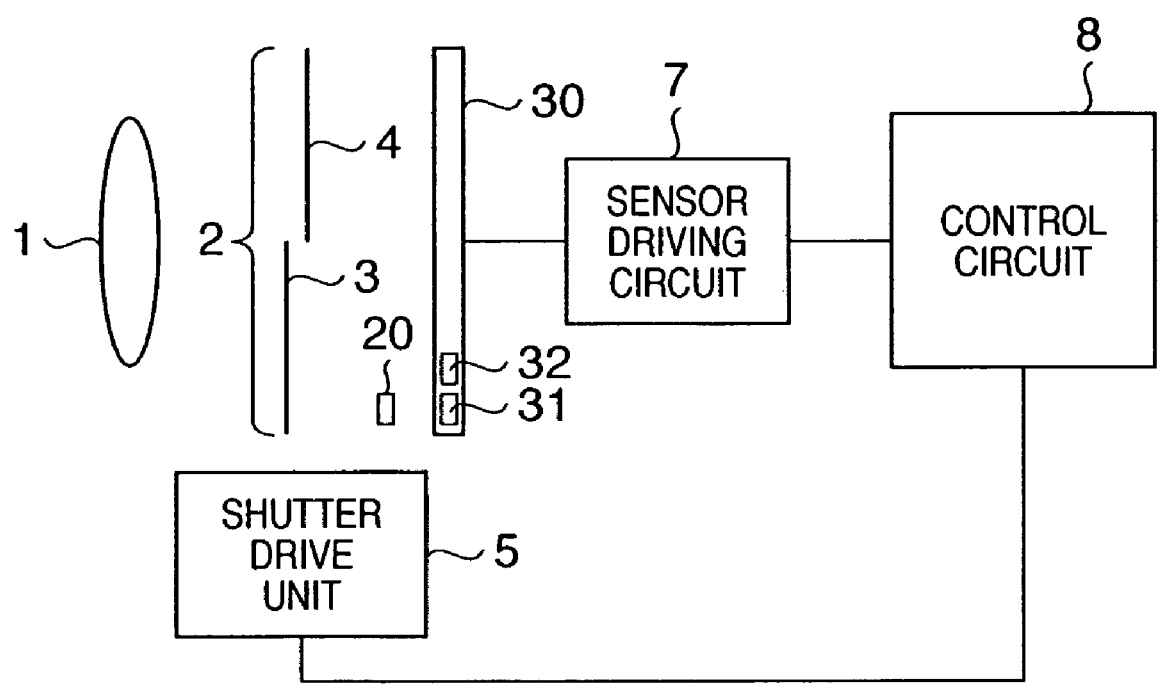
FIG. 10 is a block diagram illustrating the structure of an image input apparatus according to a fifth embodiment of the present invention.

FIG. 10 is a block diagram illustrating the structure of an image input apparatus for capturing an image using a solid-state image sensing device in a fifth embodiment of the present invention. The arrangement shown in FIG. 10 is obtained by adding a light-emitting diode 20 to the arrangement of FIG. 5. In this case, each detector of the shutter-curtain detector 31 has the structure illustrated in FIG. 9 described in the fourth embodiment.

Figure 11:
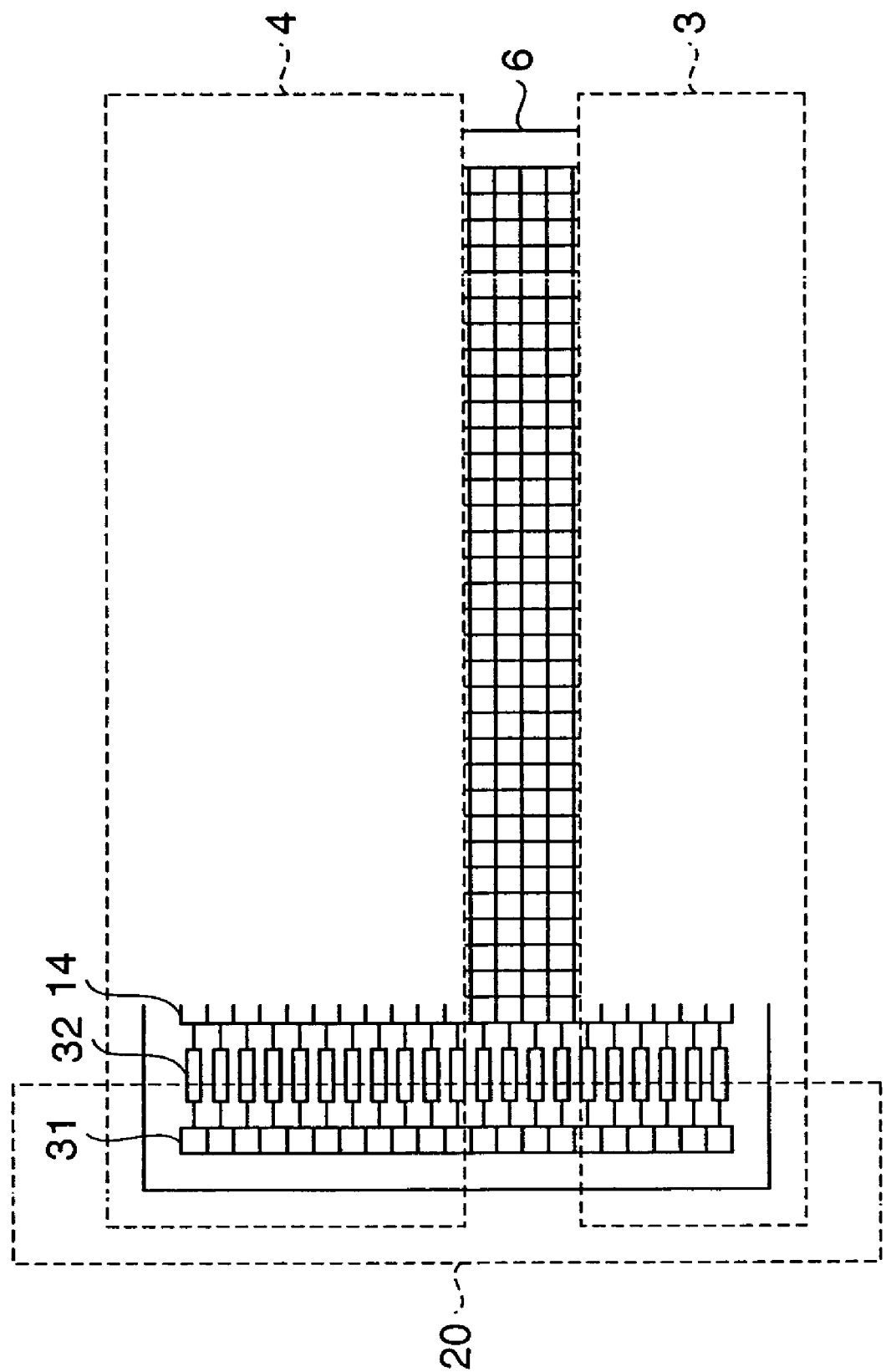
FIG. 11 is a diagram for describing placement of a solid-state image sensing device, front and rear curtains, a light-emitting diode and shutter-curtain detector according to the fifth embodiment.

FIG. 11 is a diagram illustrating placement of the solid-state image sensing device 30, the front and rear curtains 3 and 4, respectively, and the light-emitting diode 20 according to the fifth embodiment. In FIG. 11, only the part of the light emitted by the light-emitting diode 20 and passing through the slit not blocked by the front curtain 3 and rear curtain 4 reaches the photodiode 34 of the shutter-curtain detector 31 upon passing through the shutter 2. The shutter-curtain detector 31 outputs a signal of the kind indicated at 90-1 to 90-n in FIG. 3.

The output of the shutter-curtain detector 31 is input to the line-reset controller 32 and control similar to that of the third embodiment is carried out.

In accordance with the fifth embodiment as described above, effects similar to those of the first embodiment can be obtained.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-390751 filed on Nov. 20, 2003, which is hereby incorporated herein by reference herein.

What is claimed is:

1. An image input apparatus comprising:
   a solid-state image sensing device having a plurality of lines of pixels;
   a shutter having a front curtain and a rear curtain for opening and blocking an optical path to the solid-state image sensing device;
   a plurality of sensors provided at a plurality of positions corresponding to said plurality of lines of pixels of said solid-state image sensing device, each one of said plurality of sensors being configured to detect passage of said front and rear curtains; and
   a reset unit configured to reset each line of pixels of the solid-state image sensing device,
   wherein each line of pixels is reset after a predetermined period of time has elapsed since a corresponding sensor detected the passage of the front curtain and before the corresponding sensor detects the passage of the rear curtain.

2. The apparatus according to claim 1, wherein said shutter is a focal-plane shutter that transports said front and rear curtains in the longitudinal direction, and said reset unit resets the solid-state image sensing device line by line.

3. The apparatus according to claim 1, wherein the solid-state image sensing device is any one of interlaced- and frame-readout interline CCDs and CMOS sensor.

4. The apparatus according to claim 1, wherein said reset unit is constructed as an integral part of the solid-state image sensing device.

5. The apparatus according to claim 1, wherein said sensor has a light-emitting unit and a light-receiving unit and is disposed in such a manner that portions of said front and rear curtains pass between the light-emitting unit and light-receiving unit.

6. A method of controlling an image input apparatus that includes a solid-state image sensing device having a plurality of lines of pixels, a shutter having a front curtain and a rear curtain for opening and blocking an optical path to the solid-state image sensing device, and a plurality of sensors provided at a plurality of positions corresponding to said plurality of lines of pixels of said solid-state image sensing device, each of said plurality of sensors being configured to detect passage of said front and rear curtains, said method comprising:
   detecting passage of the front and rear curtains with each one of said plurality of sensors; and
   resetting each line of pixels of the solid-state image sensing device,
   wherein each line of pixels is reset after a predetermined period of time has elapsed since a corresponding sensor detected the passage of the front curtain and before the corresponding sensor detects the passage of the rear curtain.

* * * * *